A. K. HAWKES.
Eye-Glass.

No. 205,860. Patented July 9, 1878.

WITNESSES:
W. W. Hollingsworth
John C. Kenon

INVENTOR:
A. K. Hawkes
BY
ATTORNEYS.

UNITED STATES PATENT OFFICE.

ALBERT K. HAWKES, OF AUSTIN, TEXAS.

IMPROVEMENT IN EYEGLASSES.

Specification forming part of Letters Patent No. 205,860, dated July 9, 1878; application filed May 21, 1878.

*To all whom it may concern:*

Be it known that I, ALBERT K. HAWKES, of Austin, in the county of Travis and State of Texas, have invented a new and useful Improvement in Eyeglasses; and I do hereby declare that the following is a full, clear, and exact description of the same.

As heretofore constructed, the springs connecting the lenses of eyeglasses, such as are adapted to clasp the nose of the wearer, have been made in one piece, and are hence incapable of lengthwise extension or adjustment to accommodate noses of different sizes or thicknesses, or to compensate for such variations in the stiffness or strength of the springs as arise from use for a longer or shorter time.

My invention has for its object to remove these and other objections to ordinary eyeglasses; and to this end I construct the connecting-springs thereof in two parts, which are so attached one to the other as to permit convenient adjustment so as to fit any nose without pinching.

I will particularly describe my invention by reference to accompanying drawing, in which—

Figure 1:
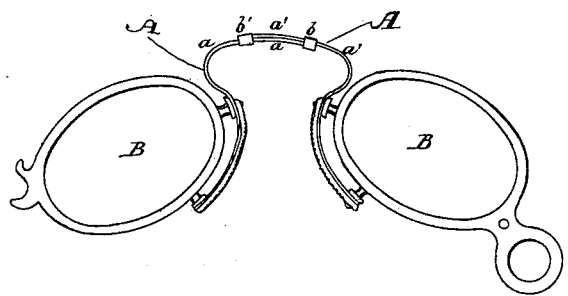
Figure 2:
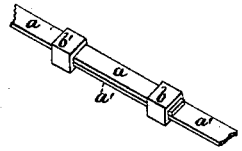

Figure 1 is a front view of a pair of eyeglasses provided with my improvement. Fig. 2 is a detail view of a fragment of the spring extended and enlarged.

The spring A, connecting the lenses B B, has the usual frame, and is attached to the bows in the usual manner. My improvement lies in making it in two parts or lengthwise halves, $a$ $a'$, and in connecting them by clasps or bands $b$ $b'$, which permit one part, $a$, to slide on the other.

One clasp, $b$, is permanently attached to the inner end of part $a$ of the spring, and slides on the other part, $b'$, while the clasp $a'$ has a similar relation to part $b'$.

By this construction it is obvious the spring may be made stronger or weaker, at will, and its pressure on the sides of the nose thereby increased or diminished, as required, without changing the distance between the lenses, by applying to the respective parts of the spring sufficient force to cause one to slide on the other.

The clasps $b$ $b'$ embrace the parts of the spring to which they are not permanently attached so tightly as to hold both parts in any adjustment by friction.

While I prefer this means for connecting the parts of the spring so as to permit adjustment, it is obvious various other devices may be successfully employed.

I am aware the use of clasps or bands to connect two sliding parts of a bar or rod is not new; also, that lenses of spectacles have been connected by a nose-piece which permits their adjustment toward or from each other corresponding to the distance between the eyes of the wearer.

What I claim is—

In combination with the lenses of eyeglasses, the connecting-spring made in two separate parts, and the clasps attached, as specified, for connecting them and permitting adjustment, for the purpose of strengthening or weakening the spring.

ALBERT K. HAWKES.

Witnesses:
EDW. W. SHANDS,
C. W. DANIEL.